United States Patent
Streete et al.

(10) Patent No.: US 9,854,002 B1
(45) Date of Patent: Dec. 26, 2017

(54) APPLICATION CENTRIC COMPLIANCE MANAGEMENT SYSTEM AND METHOD FOR A MULTI-LEVEL COMPUTING ENVIRONMENT

(71) Applicant: VCE Company, LLC, Richardson, TX (US)

(72) Inventors: Jonathan P. Streete, San Jose, CA (US); Nicholas A. Hansen, Willow Spring, NC (US); Todd Dolinsky, Chapel Hill, NC (US); Christopher M. Davis, Frisco, TX (US)

(73) Assignee: VCE Holding Company LLC, Richardson, TX (US)

( * ) Notice: Subject to any disclaimer, the term of this patent is extended or adjusted under 35 U.S.C. 154(b) by 0 days.

(21) Appl. No.: 14/580,574

(22) Filed: Dec. 23, 2014

(51) Int. Cl.
*H04L 29/00* (2006.01)
*H04L 29/06* (2006.01)

(52) U.S. Cl.
CPC .............. *H04L 63/20* (2013.01); *H04L 63/10* (2013.01)

(58) Field of Classification Search
CPC ....................................................... G06F 17/30
USPC ............................................................. 726/1
See application file for complete search history.

(56) References Cited

U.S. PATENT DOCUMENTS

| 8,032,557 B1 * | 10/2011 | Vijendra | G06Q 10/06 707/783 |
| 8,751,647 B1 * | 6/2014 | Yip | H04L 12/4641 709/225 |
| 8,776,180 B2 * | 7/2014 | Kumar | G06F 21/52 713/155 |

FOREIGN PATENT DOCUMENTS

WO    WO 2015092341    * 6/2015    ........... G06F 21/606

* cited by examiner

*Primary Examiner* — Brandon Hoffman
*Assistant Examiner* — Michael D Anderson
(74) *Attorney, Agent, or Firm* — Polsinelli PC (57) ABSTRACT

An application centric compliance management system includes a computing system that executes a tool to identify a subset of a the resources of a multi-tier computing environment that are used to execute an application, and for each identified resource, obtain one or more application-based compliance policies associated with the application. The tool may then determine whether the resource meets each application-based compliance policy, and when the resource does not meet the application-based compliance policy, generate an alarm that includes information associated with the one unmet application-based compliance policy.

20 Claims, 7 Drawing Sheets

APPLICATION CENTRIC COMPLIANCE MANAGEMENT SYSTEM AND METHOD FOR A MULTI-LEVEL COMPUTING ENVIRONMENT

TECHNICAL FIELD

Aspects of the present disclosure relate to computing devices and, in particular, to an application centric compliance management system and method for a multi-level computing environment.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, computing environments, such as converged infrastructures, were introduced and that provide a standardized package of components combined into a single, optimized computing solution. These virtual computing environments typically offer a relatively high level of customization for each application (e.g., task) by allocating or removing additional resources as demand for each application increases or decreases, respectively. Nevertheless, this high level of customization presents challenges to administrators to ensure that certain policies, such as security and performance metrics, are met. To this end, the security content automation protocol (SCAP) has been developed that specifies a standardized structure for monitoring compliance of the resources of the computing environment with any specified policies associated with applications executed on those resources.

SUMMARY

According to one aspect of the present disclosure, an application centric compliance management system includes a computing system that executes a tool to identify a subset of a the resources of a multi-tier computing environment that are used to execute an application, and for each identified resource, obtain one or more application-based compliance policies associated with the application. The tool may then determine whether the resource meets each application-based compliance policy, and when the resource does not meet the application-based compliance policy, generate an alarm that includes information associated with the one unmet application-based compliance policy.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide an application centric compliance management system and method for ensuring the resources used by an application executed in a multi-tier (N-tier) computing environment are in compliance with one or more compliance policies associated with that application. While conventional compliance management systems provide a standardized technique for ensuring compliance of resources, they only function within the scope of each resource and do not manage compliance against applications whose operation may span numerous resources that may increase and decrease as demand changes over time. That is, conventional compliance monitoring systems are generally static in that they cannot react to frequent, ongoing changes to the configuration of resources used by each application on a multi-tier computing environment. Embodiments of the present disclosure provide a solution to these problems, among other problems, by providing an application-based compliance management system that ensures compliance of the resources based upon the applications that consume those resources.

Verification of the compliance of resources against certain policies, such as performance and security policies, is a key element for organizations, particularly those that operate in, or interface with regulated industries. For example, an organization may implement a policy dictating that a particular database is confidential to the extent that it is only accessible from one or a few specified workloads in the organization's computing environment. Nevertheless, this policy may be difficult to enforce when the organization uses a multi-tier computing environment whose resources, which are used to access that database, change frequently over time. In general, multi-tier computing environments are client-server architectures having separately defined presentation, processing, and storage functions each having their own allocated set of computing devices referred to as resources. Additionally, multi-tier computing environments may use one or more resources in each tier for performance or reliability. Additionally, these conventional compliance checking systems typically determine compliance for each resource, in a static fashion, and the set of resources to be checked is not updated if the resources actually consumed by the application change.

In general, a correct configuration for every resource should be determined in advance of their use by an application. This includes resources that are exclusively consumed by the application, such as virtual objects and other physical computing resources (e.g., bare metal computing systems), as well as shared resources that are shared by multiple applications, such as network devices, firewalls, load balancing devices, compute devices, and the like. Verifying the configuration of shared devices is challenging, as the actual configuration may vary as applications are added, changed and eliminated during the course of a multi-tier computing environment operations. Furthermore, certain policies, such as service chains, may be a relatively simple concept to understand, but are relatively difficult to verify for their compliance when implemented as a set of automated resource configurations.

Conventional compliance checking systems work for traditional static approaches to multi-tier computing environment management, but they often do not scale well to larger systems in which the required configuration for every device has to be individually specified, and may in some cases, cease to function in an agile multi-tier computing environment where resources can appear and disappear, often in very short time periods, based on workload, service level agreement (SLA) requirements, and other performance criteria specified for the application. For example, in a multi-tier application, certain policies may require that a web server tier, an application server tier, and a database tier all reside on different demilitarized zone (DMZ) networks with firewalls between the networks, that a service chain requires that the web server tier and the database tier are only connected through the application server tier, and that the firewalls between the DMZ networks lock down all ports available to the Internet protocol (IP) addresses on the server(s) in each tier except those necessary for operation of the application. Adding a new resource to the web server tier to meet a particular SLA would also require the firewall policies to be updated to enable that machine to communicate with upstream and downstream devices. However, unless the compliance check configuration was simultaneously updated, the additional firewall policies to enable those additional resources would result in a compliance failure in the firewall.

As conventional compliance checking systems do not know which resources are being used by the application at any given time, they cannot rely on a static list of resources to measure for compliance. For example, a static list of resources could otherwise be identified and maintained, but this is an expensive approach, and becomes prohibitively expensive in larger systems, and relatively difficult where resources are automatically added or removed to meet SLA requirements. Where static lists of resources are maintained, security personnel and domain experts in the organization would determine the configuration necessary to achieve a set of compliance policies for every resource. Those policies would be manually translated to a document, such as one formatted according to an extensible configuration checklist description format (XCCDF), which could be used by an automated checking system to regularly verify compliance of each resource. Every time the configuration changed, or the set of resources used by the applications changed, the process would need to be repeated, and for shared devices, the rate of change may be frequent. Thus, this approach is not feasible and is labor intensive, error prone and difficult to implement in an agile environment where new resources can appear and be removed in minutes to support the performance needs of applications using those resources.

Figure 1A:
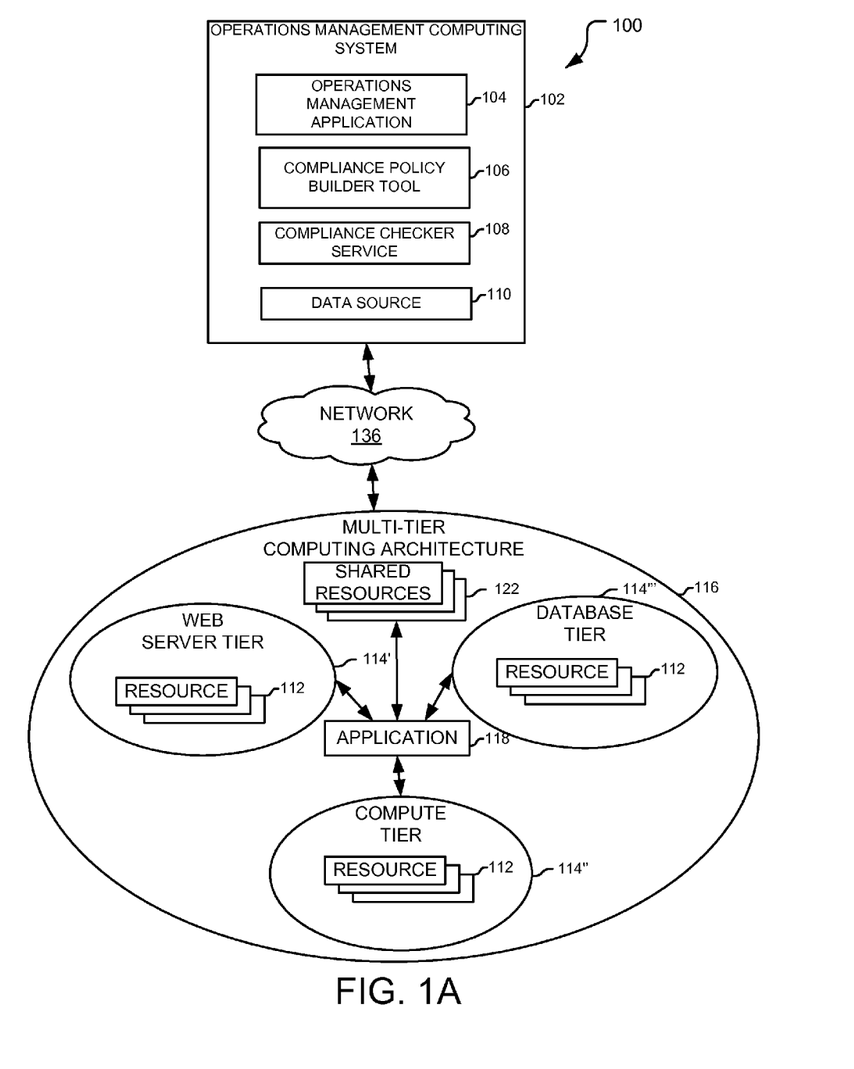
FIGS. 1A and 1B illustrate an example application centric compliance management system according to one embodiment of the present disclosure.
Figure 1B:
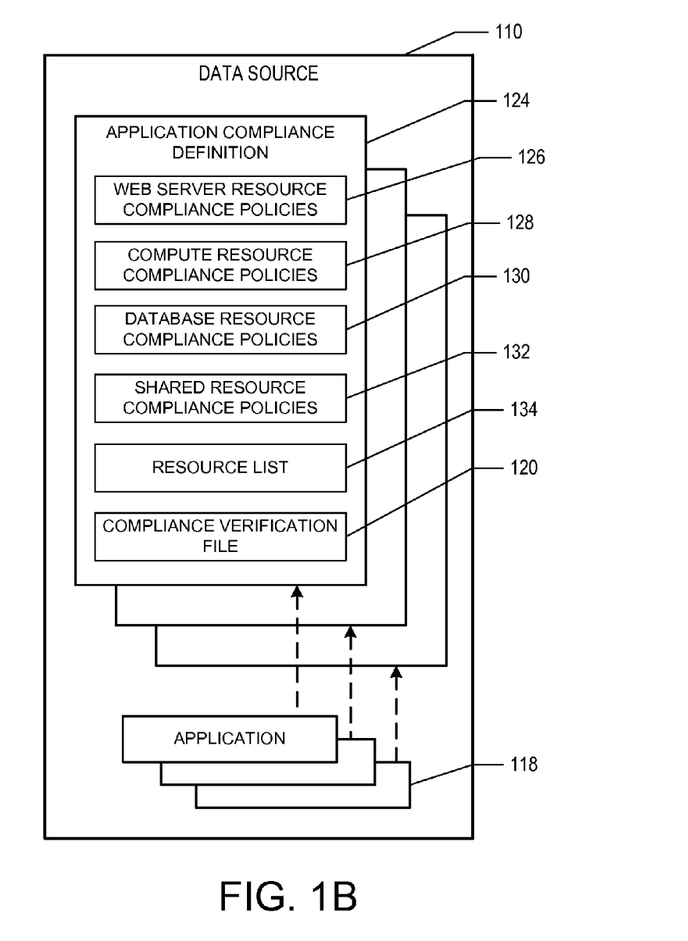

FIGS. 1A and 1B illustrate an example application centric compliance management system 100 according to the teachings of the present disclosure. The application centric compliance management system 100 addresses the problems discussed above with conventional systems among other benefits and solutions. The system 100 includes an operations management computing system 102 having an operations management application 104, a compliance policies builder tool 106, a compliance checking service 108, and a data source 110. As will be described in detail below, the compliance policies builder tool 106 communicates with resources 112 in each of multiple tiers 114 of a multi-tier computing environment 116 to ensure proper compliance of each resource 112 that executes an application 118 in the multi-tier computing environment 116.

The multi-tier computing environment 116 as shown includes a web server tier 114', a compute tier 114", and a database tier 114'" that perform various tasks of one or more applications 118, and one or more shared resources 122 deployed in the multi-tier computing environment 116. Although a web server tier 114', a compute tier 114", a database tier 114'", and shared resources 122 are shown, it should be understood that the multi-tier computing environment 116 may include any type and quantity of tiers that are physically or virtually separated from one another and function in a collaborative manner to perform the various tasks of an application executed in the multi-tier computing environment 116. In general, the web server tier 114' functions as a presentation layer to provide a user interface for the application 118, the compute tier 114" coordinates the activities of the application, processes commands, and performs logical decisions and calculations to support the functionality of the application 118, while the database tier 114'" generally functions as a storage unit to store data used by the application 118. The shared resources 122 generally include resources of the multi-tier computing environment 116 that may be shared by multiple applications. Examples of such shared resources 122 include load balancers and/or network devices, such as switches, routers, or firewalls.

The compliance policies builder tool 106 identifies a subset of resources 112 in each tier of a multi-tier computing environment 116 that are used to execute an application 118, and for each resource, obtains a set of compliance policies according to one or more application-based compliance policies associated with the operation of the application. The application-based compliance policies may be independently specified according to the tier that the resource is in, and according to the application 118 that it executes on. Once the application-based compliance policies are obtained, they may be stored in a compliance verification file 120, for example an XCCDF file that is defined as part of the SCAP standard, in the data source 110 which can then be used to verify each resource for compliance against the application-based compliance policies.

The compliance of resources generally refers to verification of the configuration of those resources to ensure certain objectives (e.g., security objectives, performance objectives, etc.) are met. For example, one compliance policy may include verifying that only certain communication ports that are required for operation of the application are open while verifying that all other communication ports (e.g., telnet ports) are closed. Other example compliance policies may include verification of a quantity and/or performance level of any processors, an amount of memory allocated to the resource, what other resources that may communicate with the subject resource (e.g., service chains), load balancing rules, redundant memory locations, and the like.

In one embodiment, the compliance policies builder tool 106 obtains application-based compliance policies from an application compliance definition 124 that is associated with each application 118 executed in the multi-tier computing environment 116. (See FIG. 1B). The application compliance definition 124 includes web server resource compliance policies 126, compute resource compliance policies 128, database resource compliance policies 130, and shared resource compliance policies 132, a resource list 134, and a compliance verification file 120. The web server resource compliance policies 126, compute resource compliance policies 128, and database resource compliance policies 130 include compliance policies associated with resources executed within their respective tiers. The shared resource compliance policies 132 include those associated with shared resources 122 that support more than one application, such as firewalls, or load-balancing resources. The resource list 134 includes a list of resources 112 that have been identified to be those that are responsible for executing the application 118.

The compliance verification file 120 stores compliance policies used to verify compliance of the resources that execute the application in a multi-tier computing environment 116. In one embodiment, the compliance verification file 120 is a XCCDF file. In general, XCCDF files is an extensible markup language (XML) formatted file that specifies one or more security checklists, benchmarks, and configuration documentation for one or more resources. In another embodiment, the XCCDF file is specified according to a SCAP protocol. In other embodiments, the compliance verification file 120 may include any suitable compliance framework protocol as embodiments of the present disclosure are not limited to just SCAP environments.

In one embodiment, the compliance policies builder tool 106 identifies the subset of resources 112 used by the application 118 by receiving the resource information from the operations management application 104. The operations management application 104 maintains information about the resources used in the multi-tier computing environment 116 and stores this information in a resource list 134 in the data source 110. The operations management application 104 may also control one or more operational characteristics of the resources executed by the multi-tier computing environment 116. Any suitable type of operations management application 104 may be implemented with the teachings of the present disclosure. In one embodiment, the application centric compliance management system 100 may include a VSPHERE™ software suite that is available from VMware Corporation, which is headquartered in Palo Alto, Calif.

Once the compliance verification file 120 is created, it may be used to determine whether the configuration of each resource meets the policies stored in compliance verification file 120, and generate an alarm or produce a report to alert administrators that a non-compliant configuration for a particular resource exists in the multi-tier computing environment for that application 118. Additionally, the compliance policies builder tool 106 may generate a new compliance verification file 120 whenever changes occur in the resources consumed by the application to account for changes in the new topology and configuration of resources of the application 118. For example, the compliance policies builder tool 106 may receive a message from the operations management application 104 when a new resource 112 is instantiated and update the compliance verification file 120 with compliance policies associated with the newly created resource 112 such that subsequent compliance verification checks may account for the newly instantiated resource.

In one embodiment, the compliance policies builder tool 106 provides the resultant compliance verification file 120 (e.g., XCCDF file) to a compliance checking service 108 that verifies compliance of the configuration of each resource 112 used by the application 118. In a particular example, the compliance checking service 108 includes a VCE Vision Intelligent Operations software suite, which is available from VCE Inc., which is headquartered in Richardson, Tex.

Embodiments of the present disclosure provide an application centric approach to compliance management in which the policies implemented for resources used in a multi-tier computing environment are based upon the application 118 that consume each resource. The application centric compliance approach eliminates at least some of the relatively manual, slow, and error-prone mapping of policies to the configuration of resources 112 used by each application as is common with conventional compliance checking services. Making service changes to an application, like adding a new resource in a tier to meet SLA demands, will automatically update the Operations Management Application 104, which will create new Compliance Verification file 120 for all resources that either provide or consume services required by the application.

For example, if an additional resource 112 has been allocated to a particular tier (e.g., for performance reasons) and the firewall policies were updated to allow access to that new resource, a compliance check against the firewall would not fail as the Compliance Verification file for the firewall is simultaneously updated. More importantly, when a resource in a particular tier is no longer needed and thus de-allocated, the Compliance Verification file for the firewall is automatically updated to reflect the de-allocation of that resource thus eliminating the possibility of an orphan (e.g., dangling) rule in the firewall that still passes a compliance check when in fact, should be flagged as non-compliant.

Furthermore, embodiments of the application centric compliance management system simplify the process of describing and ensuring compliance against service chains. A service chain generally refers to a particular type of policy that restricts interaction of one or a set of resources having a particular functionality (e.g., a tier) with those resources in another tier. For example, a security policy associated with an application may require a service chain policy, that limits access of a database server to specific resources in the application tier. In this manner, the resources of the application tier may perform the necessary verification checks upon requests for data from the database as well as requests to modify the data to ensure that the security and integrity of the database is maintained. The compliance verification file 120 may store such service chain information such that, if an invalid service chain connection is found (e.g., a web server tier is connected directly to the database tier), a non-compliant configuration is identified and a pertinent alarm generated.

The operations management computing system 102 and the multi-tier computing environment 116 communicate with one another in any suitable manner, such as using wireless, wired, and/or optical communications. In one embodiment, the operations management computing system 102 and the multi-tier computing environment 116 communicates with one another using a communication network 136, such as the Internet, an intranet, or another wired and/or wireless communication network. In another embodiment, the management computing system 102 and multi-tier computing environment 116 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the operations management computing system 102 and multi-tier computing environment 116 may communicate with one another without the use of a separate and a distinct network. Additionally, other embodiments contemplate that the modules employed by the operations management application 104 are executed by a computing device configured on the multi-tier computing environment 116.

Figure 2A:
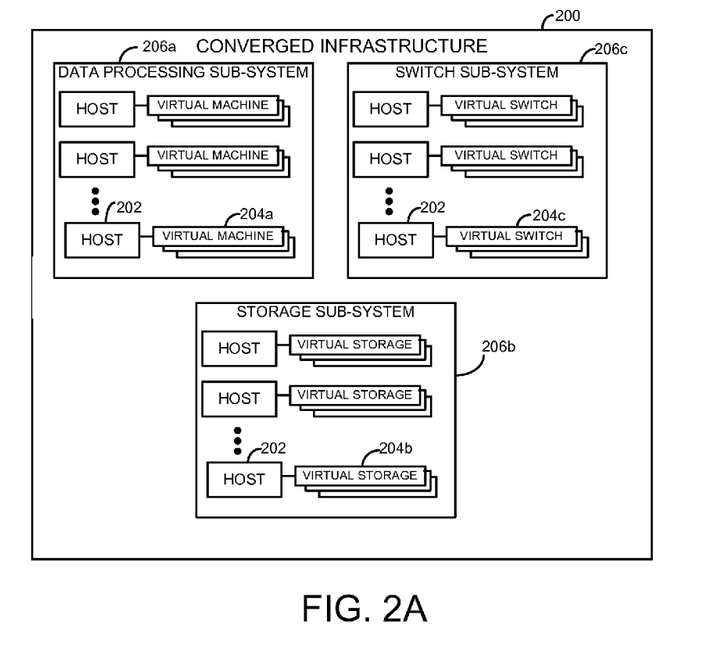
FIGS. 2A and 2B illustrate an example converged infrastructure that may be implemented as the multi-tier computing environment according to one embodiment of the present disclosure.

FIG. 2A illustrates an example converged infrastructure 200 that may provide multiple computing resources 108 to be monitored by the system 100 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure 104 such as that shown includes components found in Vblock™ System infrastructure packages available from VCE, LLC, which is headquartered in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 106 that each executes one or more virtual objects.

Each sub-system includes multiple hosts 202 that each executes one or more workloads or one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Referring again now to FIG. 1, the operations management application 104 manages various activities of the computing environment 108 and may also manage operation of the hosts 202 and virtual objects 204 of the converged infrastructure 200. For example, the operations management application 104 manages the allocation and de-allocation of resources, such as hosts and virtual objects used by the system. Additionally, the operations management application 104 may manage the remediation of failures in the system by monitoring the health of each resource and performing corrective measures, such as migration (e.g., failover) to different resources in the event that certain resources have failed or are malfunctioning in some way.

Figure 2B:
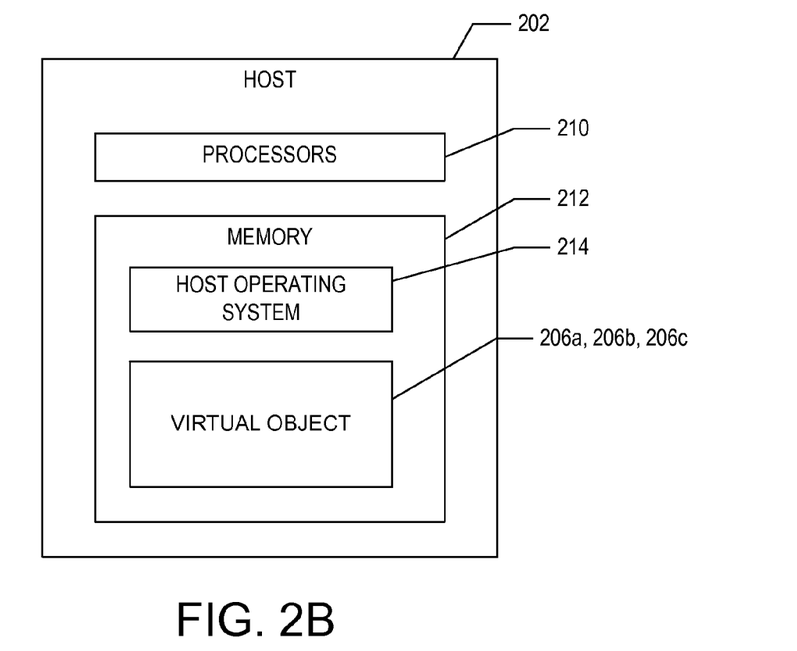

FIG. 2B illustrates an example host 202 implemented on each converged infrastructure 200 according to one aspect of the application centric compliance management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more workloads or virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

In general, the workloads or virtual objects (e.g., VMs 204a, virtual storage objects 204b, and virtual switch objects 204c) may be implemented as resources 112 of the multi-tier computing environment 116. Each virtual object may be instantiated or deleted under control of the host operating system 214, which is in turn, controlled by the operations management application 104. That is, the host operating system 214 may be controlled by the operations management application 104 to instantiate new virtual objects are they are needed and destroyed to alleviate excess capacity in their associated hosts 202. Although the present embodiment discloses one particular type of computing structure that may be implemented as a multi-tier computing environment, it should be understood that any computing environment that may adjust, add, and/or delete resources according to the needs of applications executed on the computing environments may be viable alternatives.

Figure 3:
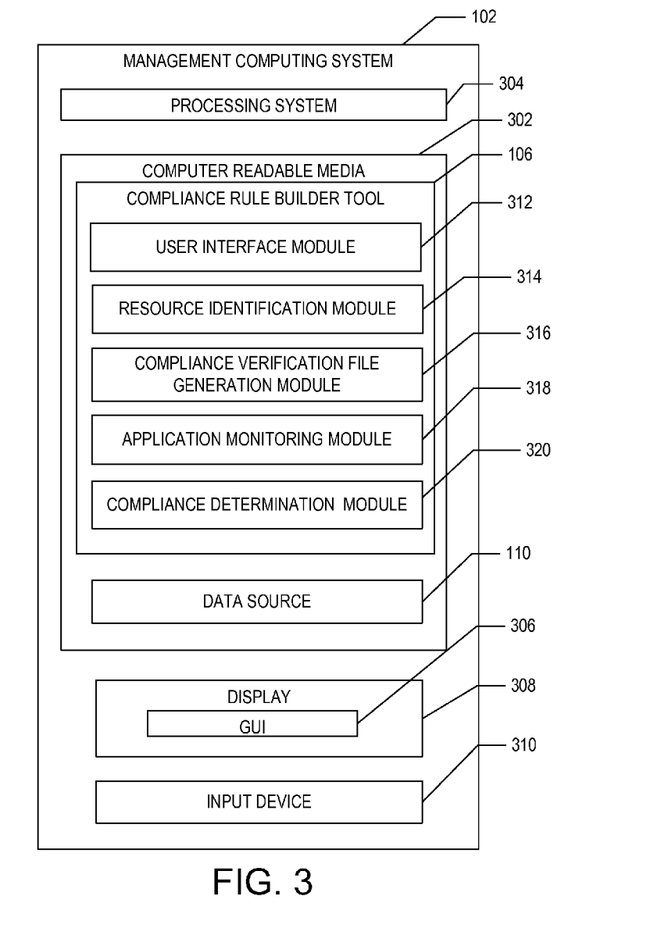
FIG. 3 is a block diagram depicting an example compliance builder tool executed on the operations management computing system according to one embodiment of the present disclosure.

Referring now in more detail to FIG. 3, a block diagram of an example compliance policies builder tool 106 executed on the management computing system 102, is depicted according to one aspect of the present disclosure. The compliance policies builder tool 106 is stored in a computer readable media 302 (e.g., memory) and is executed on a processing system 304 of the management computing system 102.

For example, the compliance policies builder tool 106 may include instructions that may be executed in an operating system environment, such as a Microsoft Windows™ operating system, a Linux operating system, or a UNIX operating system environment. As another example, the compliance policies builder tool 106 may be a HTML5 based application that is executed within a web browser, such as a Firefox™ web browser.

According to one embodiment, the operations management computing system 102 also includes a graphical user interface (GUI) 306 displayed on the display 308, such as a computer monitor, for displaying data. The operations management computing system 102 also includes an input device 310, such as a keyboard or a pointing device (e.g., a mouse, trackball, pen, or touch screen) to enter data into or interact with the GUI 306. According to one aspect, the operations management application 104 includes instructions or modules that are executable by the processing system 302 as will be described in detail herein below.

The computer readable medium 302 includes volatile media, nonvolatile media, removable media, non-removable media, and/or another available medium. By way of example and not limitation, non-transitory computer readable medium 302 comprises computer storage media, such as non-transient storage memory, volatile media, nonvolatile media, removable media, and/or non-removable media implemented in a method or technology for storage of information, such as computer readable instructions, data structures, program modules, or other data.

A user interface module 312 facilitates the receipt of input data and/or output data from or to a user, respectively. In one example, the user interface 306 may also receive user input for manipulating or otherwise modifying the operation of the operations management application 104, compliance rule builder tool 106, and/or the compliance checking tool 108. As another example, the user interface 306 may receive user input for modifying and/or reviewing the web server resource compliance policies 126, compute resource compliance policies 128, database resource compliance policies 130, and/or shared resource compliance policies 132 stored in the data source 110.

A resource identification module 314 identifies the resources used by each application 118. The resource identification module 314 may identify the resources in any suitable manner. In one embodiment, the resource identification module 314 communicates with the operation management application 118 that manages the operation of each application 118 to obtain this information. In other embodiments, the resource identification module 314 may communicate with each tier used in the multi-tier computing environment 116 directly to obtain this information. When the resources are identified, they are stored in the resource list 134 in the data source 110.

A compliance verification file generation module 316 generates a compliance verification file 120 according to one or more application-based compliance policies stored in the data source 110. In one embodiment, the application-based compliance policies may be independently specified for each tier of the multi-tier computing environment 116. The application-based compliance policies for each tier describe allowable configuration settings for each resource, such as the services that should be or should not be running on its respective resources, the ports that may or may not be open in the resource, the acceptable end-points for each network interface of the resource, and the affinity for each resource, the business continuity and disaster recovery (BCDR) policy for each data store attached to the resource, and an optional template for other compliance requirements (e.g., password policies, etc.). In some embodiments, this optional template may be provided in the form of an XCCDF file In one embodiment, resources that are shared with other applications (e.g., firewalls and load-balancer resources) may include shared resource compliance policies 132, such as descriptions for open/closed ports referenced to other resources used by other applications. The compliance verification file generation module 316 combines the shared resource compliance policies with the other compliance policies to generate the compliance verification file 120 that is stored in the data source 110.

In one embodiment, the compliance verification file generation module 316 generates service chain policies according to a topology map associated with an application executed on the multi-tier computing environment 116. The topology map may include a list of the resources from each tier 114 that are used by the application 118 along with any connections established between each resources or a set of resources. In some cases, the topology map may include a graphical representation of the resources that is displayed on a computer generated display with lines, or other suitable indicia, indicating connections between resources that may be used to generate service chain policies to be applied to the resources that are used by the application 118.

In another embodiment, the compliance verification file generation module 316 may generate policies directed to any positive or negative affinities that exist with the resources 112 used by the application 118. An affinity generally refers to a policy or performance characteristic that certain tasks of the application 118 are more conducive to be performed by the same resource (e.g., positive affinity), or are more conducive to be performed by a different resource (e.g., negative affinity). One example negative affinity may include one that restricts use of the resources 112 used by the application 118 of one merchant from also being used by another application 118 of another competing merchant. In this case, the compliance policies builder tool 106 may generate a negative affinity to verify that the resources 112 allocated for use by the application of the competing merchant is not also used by the application of the first merchant. Conversely, an example positive affinity may include one that recognizes a performance enhancement that may be obtained when two or more tasks of the application 118 are executed on the same resource. In such a case, the compliance policies builder tool 106 may generate a positive affinity policy to verify that those tasks of the application 118 are executed by the same resource 112.

An application monitoring module 318 continually monitors operation of the application 118 to detect changes in the configuration of any resources that execute the application. In one embodiment, the application monitoring module 318 may use a detection event in which a resource associated with the application has changed to initiate generation of a new compliance verification file 120. In another embodiment, the application monitoring module 318 may generate a new compliance verification file 120 at ongoing, recurring (e.g., periodic) intervals, or when demanded by an operator.

The application monitoring module 318 may detect changes in the configuration of the resources associated with the application 118 in any suitable manner. In one embodiment, the application monitoring module 318 may communicate with the operation management application 118 to receive a message each time the operation management application 118 detects a change to at least one resource that executes the application 118.

A compliance determination module 320 checks for compliance of each resource 112 associated with the application 118. In one embodiment, the compliance determination module 320 transmits the generated compliance verification file 120 to a compliance checking service 108 that verifies compliance of each resource, and receives a report indicating which policies for each resource that are non-compliant. In one embodiment, the compliance determination module 320 may generate an alarm that includes information associated with the one unmet augmented compliance configuration. The alarm may be any type, such as an audible or visual indication, and/or a message (e.g., e-mail message) that includes the non-compliant information.

It should be appreciated that the modules described herein are provided only as examples, and that the application 118 may have different modules, additional modules, or fewer modules than those described herein. For example, one or more modules as described in FIG. 3 may be combined into a single module. As another example, certain modules described herein may be encoded on, and executed on other computing systems, such as on one of the resources 112 of the multi-tier computing environment 116.

Figure 4A:
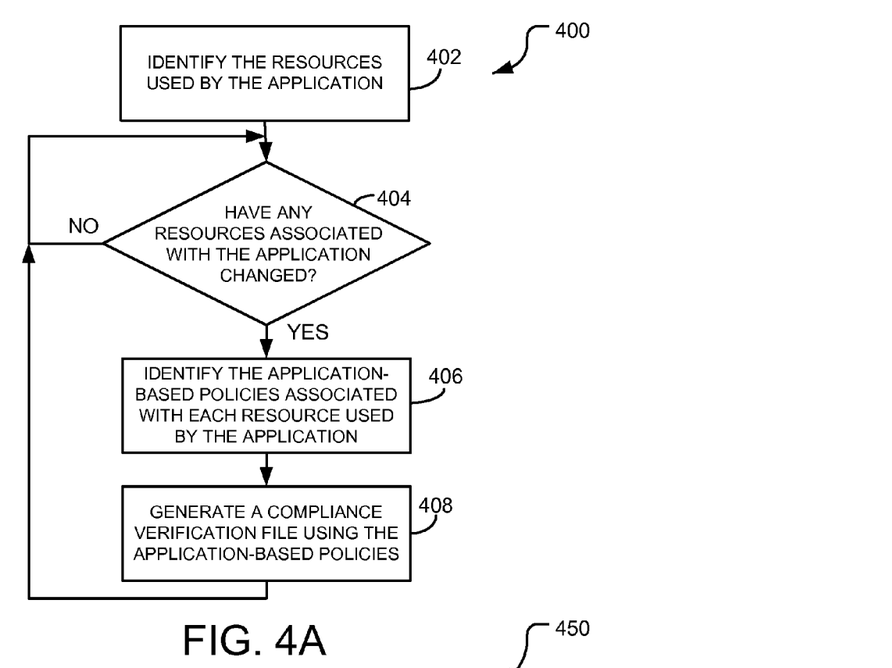
FIG. 4A illustrates an example process that is performed by the compliance policies builder tool to monitor for compliance of resources associated with an application executed in a multi-tier computing environment according to one embodiment of the present disclosure.

FIG. 4A illustrates an example process 400 that is performed by the compliance policies builder tool 106 to monitor for compliance of resources associated with an application 118 executed in a multi-tier computing environment 116 according to one embodiment of the present disclosure.

In step 402, the compliance builder tool 106 identifies the resources used by an application 118. In a particular case in which the application 118 is executed in a multi-tier computing environment 116, the resources may be the resources 112 executed on multiple tiers of the multi-tier computing environment 116. In one embodiment, the resource identification module 308 communicates with the operation management application 118 that manages the operation of each application 118 to obtain the resources used by the application 118.

In step 404, the compliance policies builder tool 106 monitors the multi-tier computing environment 116 to determine if any resources associated with the application changes. For example, the compliance policies builder tool 106 may communicate with the operation management application 118 to receive a notification message each time a resource associated with the application changes, such as when a new resource is instantiated to handle additional processing load placed on the multi-tier computing environment 116, and/or when a resource is destroyed when processing load is reduced. As long as no resources change, processing continues at step 404. However, if a change to a resource associated with the application changes, processing continues at step 406.

Although step 404 described above causes the compliance policies builder tool 106 to initiate generation of a new compliance verification file 120 and check for compliance of the resources using the new compliance verification file 120, initiation may be provided by other techniques, such as at ongoing, recurring intervals, such as on periodic basis (e.g., every 30 minutes).

In step 406, the compliance builder tool 106 identifies one or more application-based compliance policies associated with each resource that executes the application. The application-based policies may be independently specified for each tier in which the resource is executed.

In one embodiment, the compliance policies builder tool 106 determines the application-based compliance policies according to one or more shared resource compliance policies associated with how resources that execute multiple applications and/or how the resources may interact with other resources. The compliance policies builder tool 106 may combine the shared resource compliance policies for each resource with any application-based compliance policies to be applied to each resource that executes the application 118.

In step 408, the compliance policies builder tool 106 generates a compliance verification file 120 that includes the application-based compliance policies obtained in step 406. In one embodiment, the compliance verification file 120 comprises a XCCDF file. The XCCDF file is a representation of all the resources deployed for that application, including private and shared resources used by the application 118. Once the compliance verification file 120 has been generated, it is then stored in the data source for use at a later time.

The previous steps may be repeatedly performed for continual collection, identification, classification, and storage of information associated with resources used by the system 100. For example, steps 402 through 408 may be performed on periodic basis (e.g., once a day) so that up to date information for the virtual computing environment may be ensured. Nevertheless, when use of the application 118 is no longer needed or desired, the process ends.

Figure 4B:
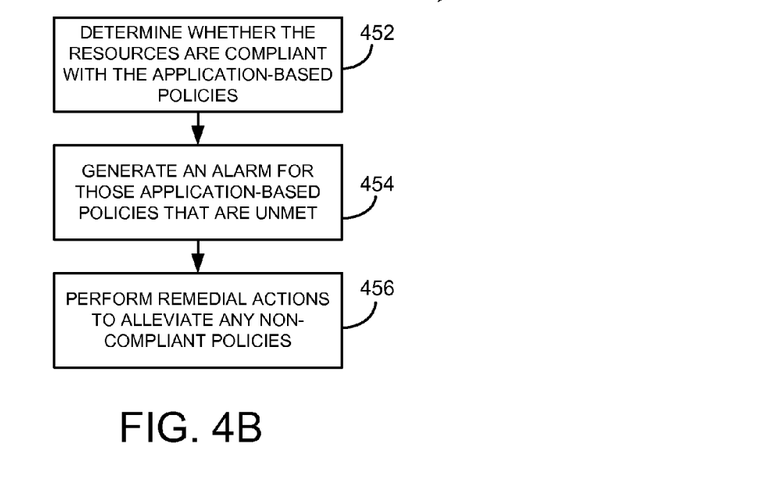
FIG. 4B illustrates another example process that is performed by the compliance policies builder tool to perform one or more remedial actions for non-compliant resources by the application according to one embodiment of the present disclosure.

FIG. 4B illustrates another example process 450 that is performed by the compliance policies builder tool 106 to perform one or more remedial actions for non-compliant resources by the application 118 according to one embodiment of the present disclosure.

In step 450, the compliance policies builder tool 106 determines whether each resource associated with the application meets the application-based compliance policies stored in the compliance verification file 120. For example, the compliance policies builder tool 106 provides the compliance verification file 120 to a compliance checking service 108 that verifies compliance of each resource.

In step 452, the compliance policies builder tool 106 generates an alarm for each resource that does not meet the policies associated with that resource. For the example above in which the compliance policies builder tool 106 provides the compliance verification file 120 to a compliance checking service 108, the compliance policies builder tool 106 may receive a report indicating which policies for each resource that is non-compliant. The compliance policies builder tool 106 may then generate an alarm that may be provided by, for example, a message indicating information associated with the one unmet augmented compliance configuration.

In step 454, the compliance policies builder tool 106 may specify one or more remedial actions to alleviate the unmet compliance policy (e.g., fix the non-compliant resource). For example, the compliance builder tool 106, or another process, or a human using a management console, may communicate with a resource to close any ports that are open but are supposed to be closed, and open any other ports that are closed but are supposed to be open. As another example, the compliance policies builder tool 106, or another process, may communicate with one or both resources from different tiers to break any connections that may be restricted between the two resources, and/or establish connections between two other resources that are not connected but are supposed to be connected. Although only two types of remedial actions are cited, it should be understood that the compliance policies builder tool 106, or another process, may be configured to perform virtually any type of remedial action to fix or otherwise alleviate any determined non-compliant parameter in each resource of the multi-tier computing environment 116 that executes the application 118.

The previous steps may be repeatedly performed for ongoing remedial actions to compensate for non-compliant resources. Nevertheless, when use of the application 118 is no longer needed or desired, the process ends.

Although FIGS. 4A and 4B describes several examples of processes that may be performed by the compliance policies builder tool 106 for identifying non-compliant configurations of resources in a multi-tier computing environment 116, the features of the disclosed process may be embodied in other specific forms without deviating from the spirit and scope of the present disclosure. For example, the compliance policies builder tool 106 may perform additional, fewer, or different operations than those operations as described in the present example. As another example, the steps of the process described herein may be performed by a system other than the compliance policies builder tool 106, which may be, for example, one of the resources executed on the multi-tier computing environment 116.

As described above, embodiments of the present disclosure may provide an environment that allows administrators to describe policies for an application 118 executed in a multi-tier computing architecture. The policies may be related to each of multiple machine classes associated with each tier and a topology of how each machine class may interact with the machine class of other tiers. Additionally, agility of the multi-tier computing environment 116 is enhanced without destroying the ability to accurately and continuously verify compliance. The agility of a multi-tier computing environment generally refers to the ability of the multi-tier computing environment to continually adapt to ongoing changes the multi-tier computing environment's configuration while maintaining an acceptable level of performance. The system 100 provides this agility by continually updating compliance as the configuration changes such that the compliance of resources may be maintained.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
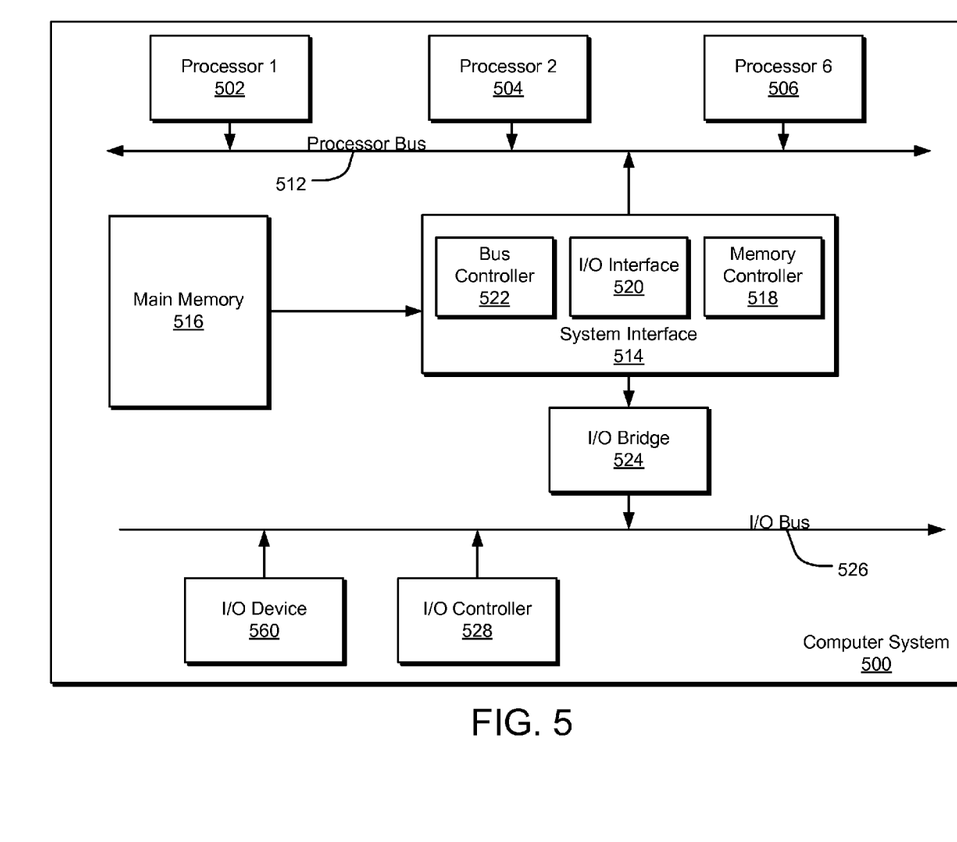
FIG. 5 is a block diagram illustrating an example of a computing device or computer system which may be used in implementing the embodiments of the present disclosure.

For example, FIG. 5 is a block diagram illustrating an example of a host or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An application centric compliance management method comprising:
   receiving, using instructions stored in a non-transitory computer-readable medium and executed on at least one processor, a notification message indicating that one or more of a plurality of resources of a multi-tier computing environment has changed, wherein the plurality of resources are being used to execute an application;
   for each of the plurality of resources, obtaining, using the instructions that are executed by the at least one processor, a service chain policy associated with the application, the service chain policy specifying that a first of the o plurality of resources is restricted to interaction with a second of the o plurality of resources in a second tier of the multi-tier computing environment, the first resource configured in a first tier of the multi-tier computing environment;
   determining, using the instructions that are executed by the at least one processor, whether the first resource meets the service chain policy, wherein the determination is performed each time the notification message is received; and
   when the first resource does not meet the service chain policy, performing, using the instructions that are executed by the at least one processor, one or more remedial actions to make the first resource compliant with the unmet service chain policy.

2. The application centric compliance management method of claim 1, wherein the remedial actions comprising at least one of generating a report of a status of the first resource, closing an unauthorized port, opening an authorized port, breaking a communication link that is restricted between the first resource and a second resource, and establishing a communication link between the first and second resources that are supposed to be connected.

3. The application centric compliance management method of claim 1, further comprising identifying the one or more resources using an operations management application.

4. The application centric compliance management method of claim 1, further comprising determining whether the one or more resources meet the application-based compliance policies using a compliance checking tool.

5. The application centric compliance management method of claim 1, further comprising obtaining the service chain policy in a compliance verification file, the compliance verification file conforming to an extensible configuration checklist description format (XCCDF) specification.

6. The application centric compliance management method of claim 5, further comprising updating the compliance verification file each time the first resource associated with the application changes in real-time.

7. The application centric compliance management method of claim 5, further comprising updating the compliance verification file at a request of at least one of a human operator or another compute process.

8. The application centric compliance management method of claim 1, further comprising obtaining the service chain policy from an application definition file stored in the non-transitory computer-readable medium, the application definition file uniquely associated with the application.

9. The application centric compliance management method of claim 1, further comprising obtaining one or more application-based compliance policies comprising at least one of a service that is expected to be running, a service that is not expected to be running, ports that are expected to be open in the first resource, ports that are expected to be closed in the first resource, acceptable end-points for each network interface of the first resource, an affinity for each resource, and a business continuity and disaster recovery (BCDR) policy for each data store attached to the first resource.

10. An application centric compliance management system comprising:
   a computing system comprising at least one processor and at least one memory to store instructions that are executed by the at least one processor to:
      receive a notification message indicating that one or more of a plurality of resources of a multi-tier computing environment has changed, wherein the plurality of resources are being used to execute an application;
      for each of the plurality of resources, obtain a service chain policy associated with the application, the service chain policy specifying that a first of the plurality of resources is restricted to interaction with a second of the plurality of resources in a second tier of the multi-tier computing environment, the first resource configured in a first tier of the multi-tier computing environment;

determine whether the first resource meets the service chain policy, wherein the determination is performed each time the notification message is received; and when the first resource does not meet the service chain policy, perform one or more remedial actions to make the first resource compliant with the unmet service chain policy.

11. The application centric compliance management system of claim 10, the remedial actions comprising at least one of generating a report of a status of the first resource, closing an unauthorized port, opening an authorized port, breaking a communication link that is restricted between the first resource and a second resource, and establishing a communication link between the first and second resources that are supposed to be connected.

12. The application centric compliance management system of claim 10, wherein the tool identifies the one or more resources using an operations management application.

13. The application centric compliance management system of claim 10, wherein the tool determines whether the first resource meets the application-based compliance policies using a compliance checking tool.

14. The application centric compliance management system of claim 13, wherein the tool stores the obtained service chain policy in a compliance verification file, the compliance verification file conforming to an extensible configuration checklist description format (XCCDF) specification.

15. The application centric compliance management system of claim 13, wherein the tool monitors the multi-tier computing environment and updates the compliance verification file each time the first resource associated with the application changes in real-time.

16. The application centric compliance management system of claim 10, wherein the tool updates the compliance verification file at periodic intervals.

17. The application centric compliance management system of claim 10, wherein the tool obtains the service chain policy from an application definition file stored in the memory, the application definition file uniquely associated with the application.

18. The application centric compliance management system of claim 10, further comprising obtaining one or more application-based compliance policies comprising at least one of a service that is expected to be running, a service that is not expected to be running, ports that are expected to be open in the first resource, ports that are expected to be closed in the first resource, acceptable end-points for each network interface of the first resource, an affinity for each resource, and a business continuity and disaster recovery (BCDR) policy for each data store attached to the first resource.

19. Code implemented in a non-transitory, computer readable medium that when executed by at least one processor, is operable to perform at least the following:

receiving a notification message indicating that one or more of a plurality of resources of a multi-tier computing environment has changed, wherein the plurality of resources are being used to execute an application;

for each of the plurality of resources, obtaining a service chain policy associated with the application, the service chain policy specifying that a first of the plurality of resources is restricted to interaction with a second of the plurality of resources in a second tier of the multi-tier computing environment, the first resource configured in a first tier of the multi-tier computing environment;

determining, whether the first resource meets the service chain policy, wherein the determination is performed each time the notification message is received; and when the first resource does not meet the service chain policy, performing one or more remedial actions to make the first resource compliant with the unmet service chain policy.

20. The code of claim 19, wherein the remedial actions comprising at least one of generating a report of a status of the first resource, closing an unauthorized port, opening an authorized port, breaking a communication link that is restricted between the first resource and a second resource, and establishing a communication link between the first and second resources that are supposed to be connected.

* * * * *

UNITED STATES PATENT AND TRADEMARK OFFICE
CERTIFICATE OF CORRECTION

PATENT NO. : 9,854,002 B1
APPLICATION NO. : 14/580574
DATED : December 26, 2017
INVENTOR(S) : Streete et al.

Page 1 of 1

It is certified that error appears in the above-identified patent and that said Letters Patent is hereby corrected as shown below:

In the Claims

- In Claim 1, Column 15, Line 58, after 'the' delete "o"; and
- In Claim 1, Column 15, Line 59, after 'the' delete "o".

Signed and Sealed this
Twelfth Day of June, 2018

Andrei Iancu
*Director of the United States Patent and Trademark Office*